US010366432B2

United States Patent
Sondhi et al.

(10) Patent No.: US 10,366,432 B2
(45) Date of Patent: Jul. 30, 2019

(54) SYSTEM, METHOD, AND NON-TRANSITORY COMPUTER-READABLE STORAGE MEDIA FOR DISPLAYING PRODUCT INFORMATION ON WEBSITES

(71) Applicant: Wal-Mart Stores, Inc., Bentonville, AR (US)

(72) Inventors: Parikshit Sondhi, Mountain View, CA (US); Varun Srivastava, Sunnyvale, CA (US); Abhishek Gattani, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 906 days.

(21) Appl. No.: 14/633,022

(22) Filed: Feb. 26, 2015

(65) Prior Publication Data

US 2016/0253733 A1 Sep. 1, 2016

(51) Int. Cl.
*G06Q 30/00* (2012.01)
*G06Q 30/06* (2012.01)
*G06F 16/951* (2019.01)

(52) U.S. Cl.
CPC ....... *G06Q 30/0625* (2013.01); *G06F 16/951* (2019.01); *G06Q 30/0601* (2013.01); *G06Q 30/0603* (2013.01); *G06Q 30/0623* (2013.01); *G06Q 30/0627* (2013.01); *G06Q 30/0629* (2013.01); *G06Q 30/0631* (2013.01); *G06Q 30/0641* (2013.01)

(58) Field of Classification Search
CPC .................. G06Q 30/0601–0645; G06Q 30/08
USPC ................................................ 705/26.1–27.2
See application file for complete search history.

(56) References Cited

U.S. PATENT DOCUMENTS

| 7,127,416 | B1 * | 10/2006 | Tenorio ................. G06Q 30/06 705/26.62 |
| 2003/0195877 | A1 * | 10/2003 | Ford ................ G06F 17/30705 |
| 2009/0187557 | A1 * | 7/2009 | Hansen ............ G06F 17/30864 |
| 2009/0204608 | A1 * | 8/2009 | Musgrove ............. G06Q 30/02 |
| 2013/0268515 | A1 | 10/2013 | Maslovskis |

OTHER PUBLICATIONS

Schwartz, Barry, Google Testing Grouping Search Results by Category, Apr. 18, 2007, Search Engine Land, [accessed at: https://searchengineland.com/google-testing-grouping-search-results-by-category-10997], accessed on Feb. 20, 2019. (Year: 2007).*

* cited by examiner

*Primary Examiner* — Resha Desai
*Assistant Examiner* — Lindsey B Smith
(74) *Attorney, Agent, or Firm* — Bryan Cave Leighton Paisner LLP

(57) ABSTRACT

A system for displaying product information is described herein. The system includes a database and a server including a processor that is programmed to receive search data associated with a product search request received and generate a ranked product list in response to the product search request. The processor selects a first sorting value indicative of a first data category included in the search data, generates a first sorted group of product records as a function of the first sorting value, and stores the first sorted group in the database. The processor selects a second sorting value indicative of a second data category, generates a second sorted group of product records as a function of the first sorted group and the second sorting value, and generates the ranked product list as a function of the second sorted group.

20 Claims, 9 Drawing Sheets

FIG. 5

| PRODUCT | CATEGORY | PRICE | RELEVANCE SCORE |
|---|---|---|---|
| P1: | Cat: C1, | Price: 50, | RelScore: 1.0 |
| P2: | Cat: C1, | Price: 10, | RelScore: 0.7 |
| P3: | Cat: C2, | Price: 5, | RelScore: 0.6 |
| ... | ... | ... | ... |
| P16: | Cat: C3, | Price: 80, | RelScore: 0.4 |
| P17: | Cat: C1, | Price: 50, | RelScore: 0.3 |
| P18: | Cat: C3, | Price: 85, | RelScore: 0.2 |
| ... | ... | ... | ... |
| P128: | Cat: C2, | Price: 70, | RelScore: 0.19 |
| ... | ... | ... | ... |
| PN: | Cat: C10, | Price: 90, | RelScore: 0.01 |

FIG. 6

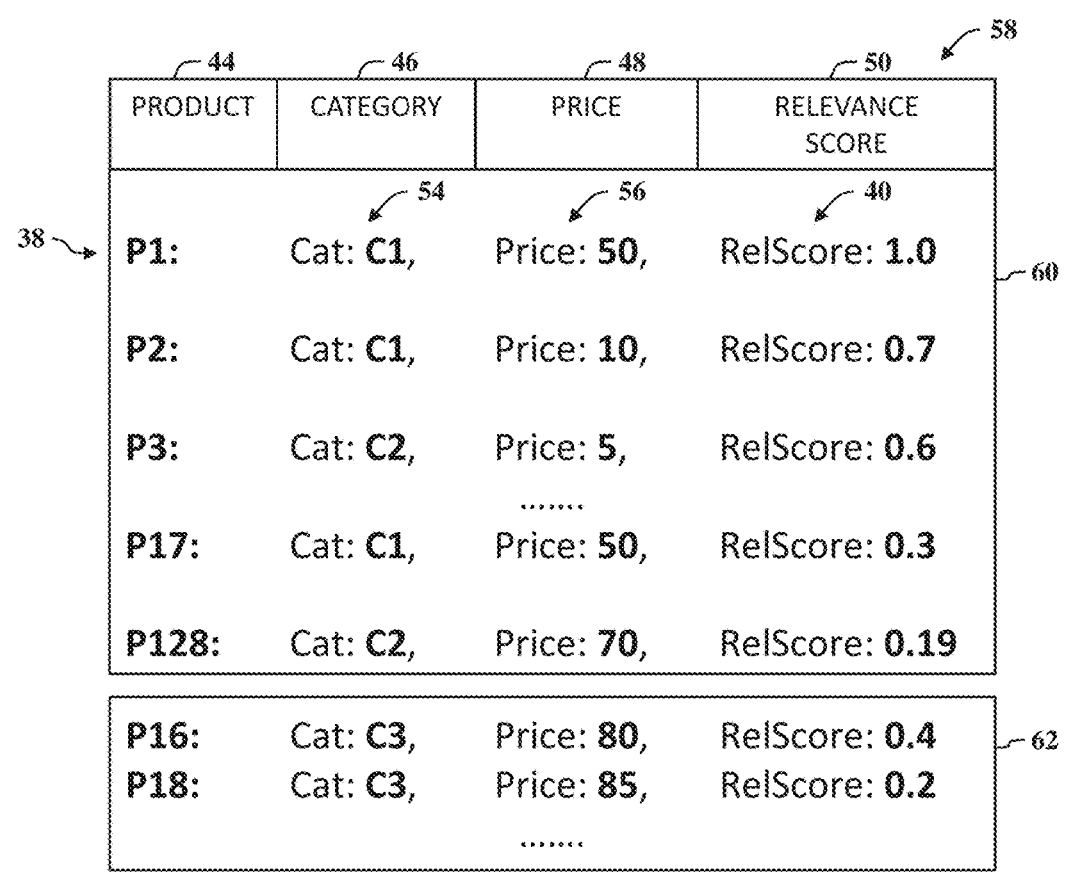

|   | ─44 | ─46 | ─48 | ─50 | ─58 |
|---|---|---|---|---|---|
|   | PRODUCT | CATEGORY | PRICE | RELEVANCE SCORE | |

|   |   | ─54 | ─56 | ─40 |   |
|---|---|---|---|---|---|
| 38→ | P1: | Cat: C1, | Price: 50, | RelScore: 1.0 | ─60 |
|   | P2: | Cat: C1, | Price: 10, | RelScore: 0.7 | |
|   | P3: | Cat: C2, | Price: 5, | RelScore: 0.6 | |
|   |   |   | ....... |   | |
|   | P17: | Cat: C1, | Price: 50, | RelScore: 0.3 | |
|   | P128: | Cat: C2, | Price: 70, | RelScore: 0.19 | |
|   | P16: | Cat: C3, | Price: 80, | RelScore: 0.4 | ─62 |
|   | P18: | Cat: C3, | Price: 85, | RelScore: 0.2 | |
|   |   |   | ....... |   | |

FIG. 7

| PRODUCT | CATEGORY | PRICE | RELEVANCE SCORE |
|---|---|---|---|
| P1: | Cat: C1, | Price: 50, | RelScore: 1.0 |
| P2: | Cat: C1, | Price: 10, | RelScore: 0.7 |
| P3: | Cat: C2, | Price: 5, | RelScore: 0.6 |
| P17: | Cat: C1, | Price: 50, | RelScore: 0.3 |
| P128: | Cat: C2, | Price: 70, | RelScore: 0.19 |
| P16: | Cat: C3, | Price: 80, | RelScore: 0.4 |
| P18: | Cat: C3, | Price: 85, | RelScore: 0.2 |

FIG. 8

| PRODUCT | CATEGORY | PRICE | RELEVANCE SCORE |
|---|---|---|---|
| P3: | Cat: C2, | Price: 5, | RelScore: 0.6 |
| P2: | Cat: C1, | Price: 10, | RelScore: 0.7 |
| P1: | Cat: C1, | Price: 50, | RelScore: 1.0 |
| P17: | Cat: C1, | Price: 50, | RelScore: 0.3 |
| P128: | Cat: C2, | Price: 70, | RelScore: 0.19 |
| P16: | Cat: C3, | Price: 80, | RelScore: 0.4 |
| P18: | Cat: C3, | Price: 85, | RelScore: 0.2 |

FIG. 9

SYSTEM, METHOD, AND NON-TRANSITORY COMPUTER-READABLE STORAGE MEDIA FOR DISPLAYING PRODUCT INFORMATION ON WEBSITES

FIELD OF THE DISCLOSURE

The present invention relates to providing product information to a consumer, and more particularly, to systems, methods, and computer-readable storage media that generates and displays product information via a website in response to a consumer's product search request.

BACKGROUND

Many consumers desire to order items or goods remotely, e.g., on-line, through the Internet, or using a specially designed application or app on a personal computer or mobile device, such as a tablet or cell phone. At least some known web hosting systems include search engines that allow consumers to enter search criteria and generate search results based on the consumer's search criteria. Known search engines may generate and display product lists to consumers via a website including products that are selected based on the search criteria. Some known search engines may also generate search relevance scores associated with selected products based on the search terms entered by the consumer.

In addition, known search engines may sort the selected products based on product price. However, these known search engines may not take the relevance scores into account when displaying products arranged based on price in either low to high price sorts or high to low price sorts. Rather, these known search engines simply sort results in ascending or descending order of price, which provides no guarantees on relevance of products and often leads to highly irrelevant products showing up at the top of a sorted list. Overtime, consumers may become frustrated with the displayed results, in part, because the sorted lists do not display products that are relevant to the consumers needs.

In addition, in response to a product search request, at least some known search engines retrieve each product record contained in a database and display each product record in a sorted list. Because of the number of product records that may be included in a product database, at least some known search engines require significant computing time and resources to generate and display the sorted product lists to the consumer. As the amount of product records being included in a database increases, the amount of computing resources that are required to perform the search functions increase, thus reducing the overall performance of known web hosting systems.

The present invention is aimed at one or more of the problems identified above.

SUMMARY OF THE INVENTION

In different embodiments of the present invention, systems, methods, and computer-readable storage media allow users to display relevant product information to a consumer via a website.

In one embodiment, a system for displaying product information on a website is provided. The system includes a database and a server including a processor. The processor is programmed to receive search data associated with a product search request received via the website. The search data including a plurality of product records, each of the product records including a plurality of data categories including corresponding category values. The processor selects a first sorting value indicative of a first data category, generates a first sorted group of product records as a function of the first sorting value, and stores the first sorted group in the database. The first sorted group includes product records having corresponding category values matching the first sorting value. The processor selects a second sorting value indicative of a second data category and generates a second sorted group of product records as a function of the first sorted group and the second sorting value. The second sorted group includes product records included in the first sorted group and having corresponding category values matching the second sorting value. The processor also generates a product list as a function of the second sorted group and displays the product list on the website in response to the product search request.

In another embodiment a method for displaying product information on a website is provided. The method includes receiving search data associated with a product search request received via the website and generating a product list in response to the product search request. The search data includes a plurality of product records, each of the product records including a plurality of data categories including corresponding category values. The method includes selecting a first sorting value indicative of a first data category, generating a first sorted group of product records as a function of the first sorting value, and storing the first sorted group in a database. The first sorted group includes product records having corresponding category values matching the first sorting value. The method includes selecting a second sorting value indicative of a second data category and generating a second sorted group of product records as a function of the first sorted group and the second sorting value. The second sorted group includes product records included in the first sorted group and having corresponding category values matching the second sorting value. The method includes generating the product list as a function of the second sorted group and displaying the product list on the website.

In yet another embodiment, one or more non-transitory computer-readable storage media, having computer-executable instructions embodied thereon are provided. When executed by at least one processor, the computer-executable instructions cause the processor to receive search data associated with a product search request received via a website and generate a product list in response to the product search request. The search data includes a plurality of product records, each of the product records including a plurality of data categories including corresponding category values. The processor selects a first sorting value indicative of a first data category, generates a first sorted group of product records as a function of the first sorting value, and stores the first sorted group in a database. The first sorted group includes product records having corresponding category values matching the first sorting value. The processor selects a second sorting value indicative of a second data category and generates a second sorted group of product records as a function of the first sorted group and the second sorting value. The second sorted group includes product records included in the first sorted group and having corresponding category values matching the second sorting value. The processor generates the product list as a function of the second sorted group and displays the product list on the website in response to the product search request.

BRIEF DESCRIPTION OF THE FIGURES

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings wherein:

FIG. 5 is an illustration of an exemplary screenshot from the system of FIG. 1, according to an embodiment of the present invention;

FIG. 6 is an illustration of an exemplary screenshot from the system of FIG. 1, according to an embodiment of the present invention;

FIG. 7 is an illustration of an exemplary screenshot from the system of FIG. 1, according to an embodiment of the present invention;

FIG. 8 is an illustration of an exemplary screenshot from the system of FIG. 1, according to an embodiment of the present invention; and FIG. 9 is an illustration of an exemplary screenshot from the system of FIG. 1, according to an embodiment of the present invention.

Figure 1:
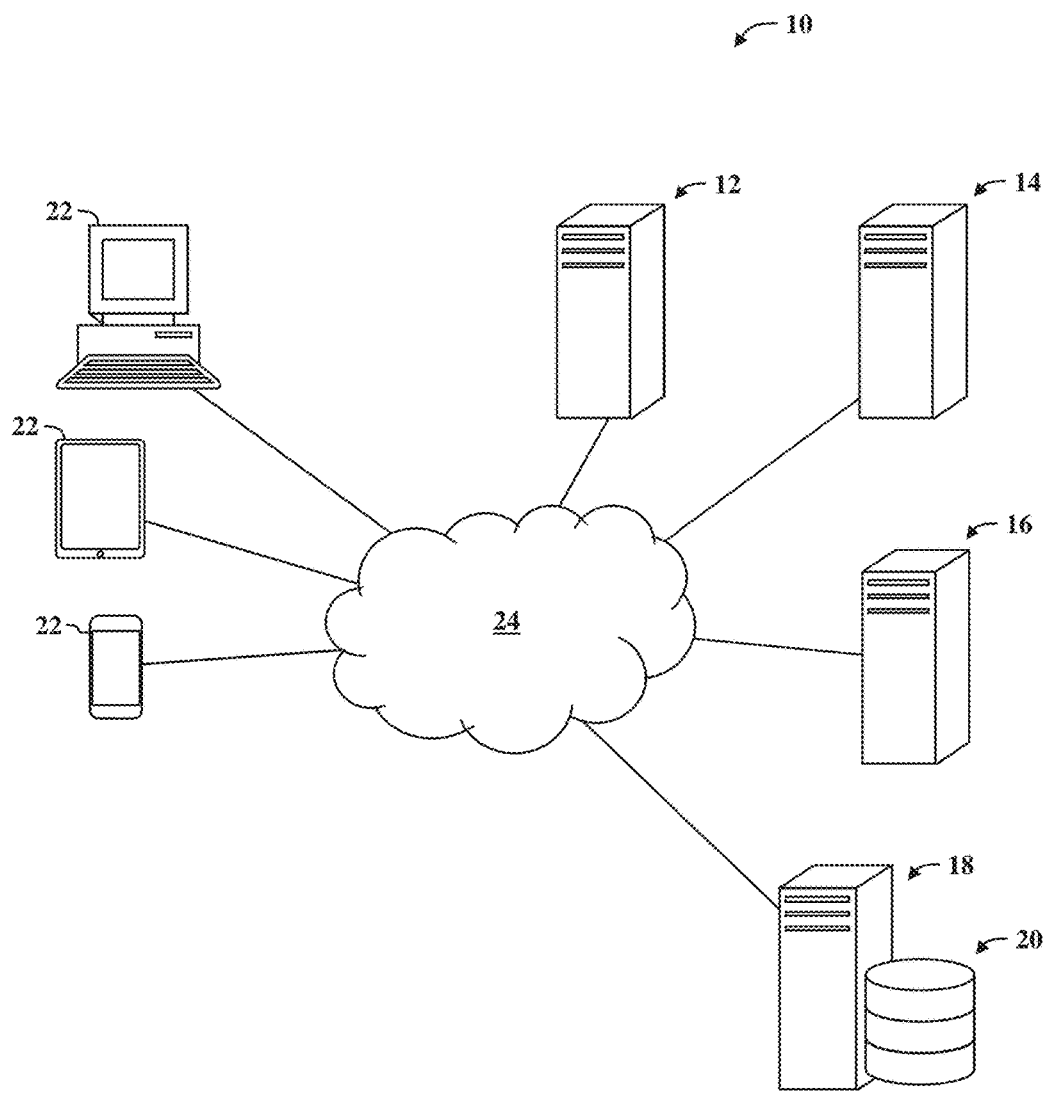
FIG. 1 is a schematic illustrating various aspects of a system, according to the present disclosure.

Corresponding reference characters indicate corresponding components throughout the several views of the drawings Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with".

This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis. The term "coupled" means any suitable communications link, including but not limited to the Internet, a LAN, a cellular network, or any suitable communications link. The communications link may include one or more of a wired and wireless connection and may be always connected, connected on a periodic basis, and/or connected on an as needed basis.

The disclosure particularly describes how product information may be displayed via a website to a consumer to increase the likelihood of the consumer purchasing one or more products being displayed and increase a conversion rate of the corresponding webpage. The conversion rate may be indicative of a rate at which a corresponding web page facilitates a user completing a predefined user activity such as, for example, viewing a predefined web page, ordering a product and/or service, and/or performing a predefined user task. Particularly, the present disclosure describes how a system provides a website to a consumer, receives a product search request from the consumer via a search webpage and generates and displays a ranked product list to the consumer in response to the request. The ranked product list is generated as a function of a plurality of categories associated with product records. The system generates a plurality of sorted groups based on the product record categories to generate the product list to display products that are relevant to the request of the consumer.

For example, in one embodiment, the system may generate search data including a plurality of product records associated with a search request received from a consumer with each of the product records including a plurality of record categories such as, for example, a product category, a product price, and/or a relevance score. The system may analyze the search data and generate a plurality of sorted groups and/or data buckets as a function of the frequency at which each product category appears in the search data. For example, the system may generate one or more first sorted groups including product records having associated product categories that appear most frequently in the search data. The system may also select a relevance score and generate a second sorted group as a function of the selected relevance score. For example, the system may generate the second sorted group including product records included in the first sorted group and having a relevance score that is greater than, or equal to, the selected relevance score. The system may also generate the ranked product list including the data records included in the second sorted group and ranked based on the corresponding product prices.

With reference to the FIGS. and in operation, the present invention provides a system 10, methods and computer product media that facilitates displaying product information to a user via a website. Referring to FIG. 1, an exemplary environment in which the system 10 operates is illustrated. In the illustrated embodiment, the system 10 is configured to enable a user to access a website with one or more user computing devices to view information indicative of products that may be purchase by the user via the website. In general, the system 10 generates and displays product lists in response to receiving a product search request from a consumer via a website. The system 10 generates search data including a plurality of product records as a function of the search request, and analyses the search data and generates sorted groups of product records based on one or more data categories included in the product records. The system 10 generates and displays the product lists as a function of the sorted groups to display products to the user, e.g. the consumer, that are relevant to the consumer's search request.

By generating sorted groups based on the data categories included in the search data and displaying product lists based on the sorted groups, the system transforms the search data into relevant product information and generates and displays product listings that are more relevant to the needs of the consumer over known search engines and that increase the likelihood of a consumer purchasing a product displayed in the list, thus increasing the overall revenue being generated by the website. For example, the system provides relevant product listings without requiring the consumers to input filter queries and/or product categories, thus reducing the effort required by the consumer to retrieve the desired products from the website.

In addition, by generating the sorting groups from the search data and generating the ranked product list based on the sorted data groups, the system 10 improves the speed and functionality of known computing systems by reducing the amount of product records being displayed in response to a user's search request, thus reducing the computing resources required to generate and display relevant search results.

For clarity in discussing the various functions of the system 10, multiple computers and/or servers are discussed as performing different functions. These different computers (or servers) may, however, be implemented in multiple different ways such as modules within a single computer, as nodes of a computer system, etc. . . . The functions performed by the system 10 (or nodes or modules) may be centralized or distributed in any suitable manner across the system 10 and its components, regardless of the location of specific hardware. Furthermore, specific components of the system 10 may be referenced using functional terminology in their names. The function terminology is used solely for purposes of naming convention and to distinguish one element from another in the following discussion. Unless otherwise specified, the name of an element conveys no specific functionality to the element or component.

In the illustrated embodiment, the system 10 includes a website hosting server 12, a search engine server 14, a sorting server 16, a database server 18, a database 20, and one or more user computing devices 22 that are each coupled in communication via a communications network 24. The communications network 24 may be any suitable connection, including the Internet, file transfer protocol (FTP), an Intranet, LAN, a virtual private network (VPN), cellular networks, etc. . . . , and may utilize any suitable or combination of technologies including, but not limited to wired and wireless connections, always on connections, connections made periodically, and connections made as needed.

The user computing device 22 may include any suitable device that enables a user to access and communicate with the system 10 including sending and/or receiving information to and from the system 10 and displaying information received from the system 10 to a user. For example, in one embodiment, the user computing device 22 may include, but is not limited to, a desktop computer, a laptop or notebook computer, a tablet computer, smartphone/tablet computer hybrid, a personal data assistant, a handheld mobile device including a cellular telephone, and the like.

The database server 18 includes a memory device that is connected to the database 20 to retrieve and store information contained in the database 20. The database 20 contains information on a variety of matters, such as, for example, web pages associated with one or more websites, customer account information, product records, data categories, category values, sorted data groups, and/or any suitable information that enables the system 10 to function as described herein.

Figure 4:
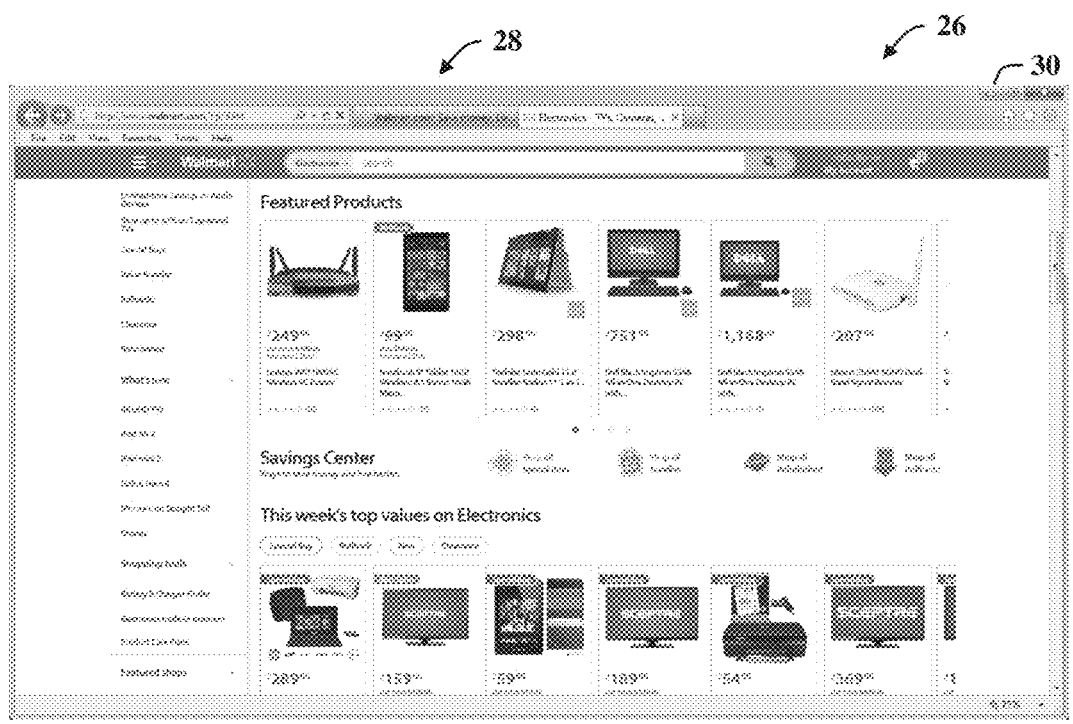
FIG. 4 is an illustration of an exemplary screenshot from the system of FIG. 1, according to an embodiment of the present invention.
Figure 5:
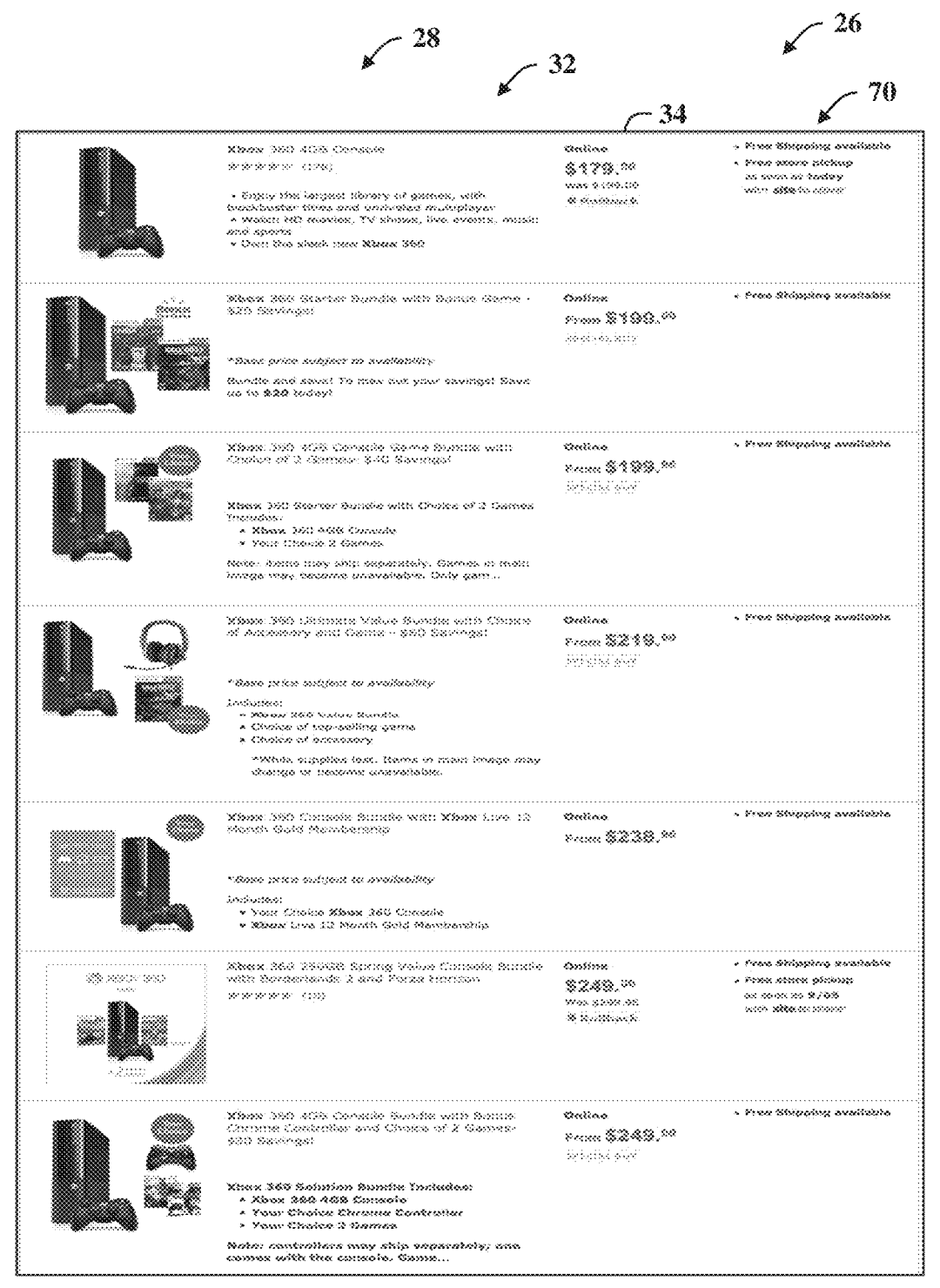

The website hosting server 12 is configured to host a website 26 that is accessible by a user via one or more user computing devices 22. The website hosting server 12 retrieves and stores web pages 28 (shown in FIGS. 4 and 5) associated with one or more websites 26 in response to requests received by the user via the user computing device 22 to allow users to interact with the website and search and/or purchase products such as, for example, goods and/or services via the website. In one embodiment, the website hosting server 12 is configured to generate and display web pages 28 associated with the website in response to requests being received from consumers via corresponding web browsers that are displayed on the user computing devices 22. For example, in one embodiment, the website hosting server 12 may display a product search webpage 30 (shown in FIG. 4) in response to receiving a user request that allows a user to input a product search request including search criteria including one or more search terms. In addition, the website hosting server 12 may transmit the product search request to the search engine server 14 and/or the sorting server 16 for use in generating search data and/or product lists in response to the user's search request. The website hosting server 12 may also receive one or more product lists 32 (shown in FIG. 5) from the search engine server 14 and/or the sorting server 16 that includes information associated with products that are selected based on the user's search criteria. The website hosting server 12 may also display a search results webpage 34 to display the product lists 32 to the user and to allow the user to select one or more of the displayed products for purchase.

In the illustrated embodiment, the search engine server 14 is configured to receive a product search request from the website hosting server 12 including one or more search terms, and generate search data including a plurality of product records as a function of the search terms. For example, in one embodiment, the search engine server 14 may initiate a search algorithm based on a Boolean model to search product records contained in the database 20 based search terms received from the user. The search engine server 14 generates a search data set 36 (shown in FIG. 6) including product records 38 matching the search criteria, and generates a relevance score 40 associated with each product record 38 included in the search data set 36. In one embodiment, the relevance score 40 may be determined based on statistical information, including, but not limited to the number of product records in the database, the frequency in which the search terms appear in the database, and the frequency in which the search term appears in the product record. The relevance of a returned search record may be determined based on the corresponding relevance score and the relevance scores of the other product records in the search data set 36, wherein product records 38 having a higher relevance scores are more relevant to the search criteria. For example, in one embodiment, the product records may include a product description including one or more terms associated with the corresponding product. The search engine server 14 may generate a relevance score associated with the product record as a function of the number of terms included in the product description that match the search terms included with product search request. In addition, the relevance score may be determined within a range between about 0.01 to 1.0, with a relevance score of 1.0 being indicative of the most relevant product record. Many variations to the above described method of determining a relevance score associated with a search request fall within the scope of the present invention.

In the illustrated embodiment, the search engine server 14 generates the search data 36 in response to the user's product search request and transmits the search data 36 to the sorting server 16 for use in generating product lists 32 being displayed to the user via one or more search results webpages 34. In one embodiment, the search engine server 14 generates the search data 36 including a plurality product records 38. Each product record 38 includes a plurality of data categories 42. For example, referring to FIG. 6, in one embodiment, the data categories 42 may include, but are not limited to, a product description 44, a product category 46, a price data category 48, and/or a relevance score data category 50. In addition, each data category 42 includes a corresponding category value 52. For example, each product record 38 may include a product category value 54 associated with the product category 46, a price value 56 associated with the price data category 48, and/or a search relevance score value 40 associated with the relevance score data category 50.

The sorting server 16 is configured to receive the search data 36 associated with the product search and generate the product list 32 in response to the product search request. In the illustrated embodiment, the sorting server 16 analyses the search data 36 to select a first sorting value that is indicative of one or more data categories, and generates a first sorted group 58 (shown in FIG. 7) of product records 38 as a function of the first sorting value. For example, in one embodiment, the sorting server 16 may analyze the search data 36 to determine a frequency at which each product category value 54 appears in the search data 36 and select the first sorting value as a function of the frequency of each product category value 54. The sorting server 16 may generate the first sorted group 58 of product records 38 as a function of the first sorting value and store the first sorted group 58 in the database 20. In one embodiment, the sorting server 16 may generate the first sorted group 58 including product records 38 having corresponding category values matching the first sorting value.

For example, in one embodiment, the sorting server 16 may generate a ranked list of product category values 54 based on a number of times each product category value 54 appears in the search data 36, and select the first sorting value as a function of the ranked list of product category values 54. As shown in FIG. 7, in one embodiment, the product records 38 may include product category values 54 including, for example, C1, C2, C3 . . . CN that are indicative of each product category that may be associated with a corresponding product. The sorting server 16 generates a ranked list of product category values 54 and determines the product category values 54 having the highest frequency of appearance in the search data 36. The sorting server 16 may select a first sorting value indicative of the product category value 54 having the highest appearance frequency, and generate the first sorted group 58 including product records 38 having corresponding product category values 54 matching the first sorting value.

In addition, the sorting server 16 may also select a set of first sorting values based on the ranked list of product category values 54, and generate the first sorted group 58 including product records 38 having corresponding product category values 54 matching at least one sorting value included in the set of first sorting values. For example, the sorting server 16 may select one or more product category values 54 having high appearance frequencies (for example, C1 and C2 in FIG. 7) and generate the first sorted group 58 including product records 38 having corresponding product category values 54 matching the selected product category values 54. The sorting server 16 may also select the set of first sorting values including a predefined number of product category values 54.

The sorting server 16 may also generate a plurality of first sorting groups 58 based on the first sorting value. For example, as shown in FIG. 7, in one embodiment, the sorting server 16 may generate a primary first sorted group 60 including product records 38 having product category values 54 matching the first sorting value, and a secondary first sorted group 62 including product records 38 having product category values 54 that do not match the first sorting value.

In the illustrated embodiment, the sorting server 16 is configured to select a second sorting value indicative of a second data category 42 and generate a second sorted group 64 of product records 38 (shown in FIG. 8) as a function of the first sorted group 58 and the second sorting value. The sorting server 16 is configured to generate the second sorted group 64 including product records 38 included in the first sorted group 58 and having corresponding category values 52 matching the second sorting value.

In one embodiment, the sorting server 16 may select the second sorting value including one or more search relevance score values 40 associated with the relevance score data category 50 and generate the second sorted group 64 as a function of the selected relevance score values 40. In one embodiment, the sorting server 16 may generate the second sorted group 64 including product records 38 having relevance values 40 that are equal to or greater than the second sorting value. In another embodiment, the sorting server 16 may select the second sorting value including a range of relevance values 40 and generate the second sorted group 35 including product records 38 having corresponding relevance values that are within the selected range of relevance values.

For example, referring to FIG. 8, in one embodiment, the product records 38 may include search relevance score values 40 within a range between about 0.01 and 1.0. The sorting server 16 may select the second sorting value including a search relevance score value 40 such as, for example, a 0.6 relevance score. The sorting server 16 may then generate the second sorted group 64 including the product records 38 included in the first sorted group 58 and having a corresponding search relevance score values 40 that is greater than or equal to the second sorting value of 0.6 relevance score.

In one embodiment, the sorting server 16 may generate a plurality of second sorting groups 64 as a function of the first sorted group 58 and the second sorting value. For example, the sorting server 16 may generate a primary second sorted group 66 and a secondary second sorted group 68 including product records 38 included in the first sorted group 58. The sorting server 16 may generate the primary second sorted group 66 including product records 38 included in the first sorted group 58 and having corresponding search relevance score values 40 that are greater than or equal to the second sorting value, and generate the secondary second sorted group 68 including product records 38 included in the first sorted group 58 and having corresponding search relevance score values 40 that are less than the second sorting value. In addition, in one embodiment, the sorting server 16 may generate a primary second sorted group 66 and a secondary second sorted group 68 including product records 38 included in the primary first sorted group 60.

In the illustrated embodiment, the sorting server 16 generates a product list 32 (shown in FIGS. 5 and 9) as a function of the second sorted group 64 and transmits the product list 32 to the website hosting server 12 for use in displaying the product list 32 to the user. In one embodiment, the sorting server 16 may generate the product list 32 including a predefined number of product records 38 included in the second sorted group 64. In addition, the sorting server 16 may select the number of product records 38 being included in the product list 32 as a function of a predefined multiple of product records 38. For example, the sorting server 16 may select the number of product records 38 being approximately equal to a 16× multiplier and/or a 20× multiplier, such that the number of product records 38 included in the product list 32 is a multiple of 16 and/or 20.

In one embodiment, the sorting server 16 may generate a ranked product list 70 including product records 38 included in the second sorted group 64 and ranked as a function of the corresponding price values 56, and display the ranked product list 70 via the website 26. For example, in one embodiment, the sorting server 16 may generate the ranked product list 70 including product records 38 sorted from lowest price value to highest price value. In another embodiment, the sorting server 16 may generate the ranked product list 70 including product records 38 sorted from highest price value to lowest price value. Moreover, the sorting server 16 may generate the ranked product list 70 based on one or more data categories 42 included in the product records 38 and/or based on a user preference received via the website 26.

Figure 2:
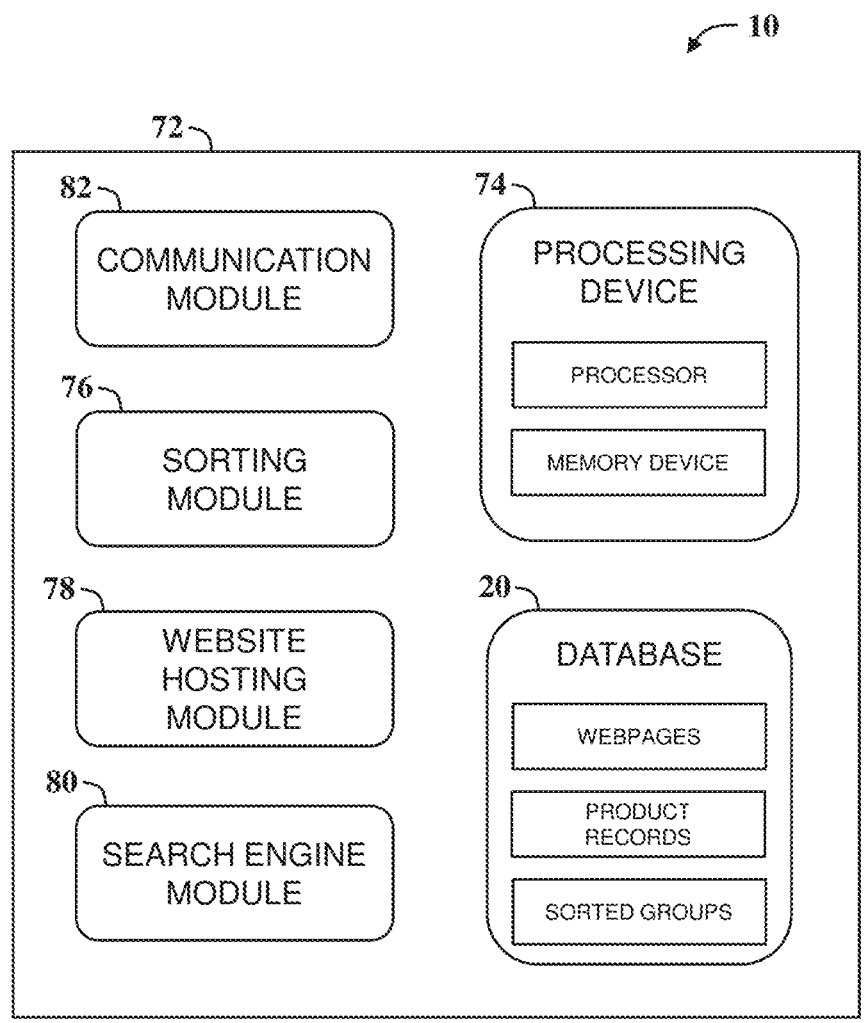
FIG. 2 is a schematic illustrating example components of a server, according to an embodiment of the present invention.

Referring to FIG. 2, in one embodiment, the system 10 may include a system server 72 that is configured to perform the functions of the website hosting server 12, the search engine server 14, the sorting server 16, and the database server 18. In the illustrated embodiment, the system server 72 includes a processing device 74 and the database 20.

The processing device 74 executes various programs, and thereby controls components of the system server 72 according to user instructions received from the user computing device 22. The processing device 74 may include memory, e.g., read only memory (ROM) and random access memory (RAM), storing processor-executable instructions and one or more processors that execute the processor-executable instructions. In embodiments where the processing device 74 includes two or more processors, the processors can operate in a parallel or distributed manner. In an example, the processing device 74 may execute a sorting module 76, a website hosting module 78, and a search engine module 80, and a communications module 82.

The processing device 74 may also include a memory device for storing programs and information in the database 20, and retrieving information from the database 20 that is used by the processor to perform various functions described herein. The memory device may include, but is not limited to, a hard disc drive, an optical disc drive, and/or a flash memory drive. Further, the memory device may be distributed and located at multiple locations.

The communications module 82 retrieves various data and information from the database 20 and sends information to the user computing device 22 via the communications network 24 to enable the user to access and interact with the system 10. In one embodiment, the communications module 82 displays various images on a graphical interface of the user computing device 22 preferably by using computer graphics and image data stored in the database 20 including, but not limited to, web pages, product records, sorted groups, product lists, and/or any suitable information and/or images that enable the system 10 to function as described herein.

The website hosting module 78 may be programmed to perform some or all of the functions of the website hosting server 12 including hosting various web pages associated with one or more websites that are stored in the database 20 and that are accessible to the user via the user computing device 22. The website hosting module 78 may be programmed to generate and display web pages associated with a website in response to requests being received from users via corresponding web browsers.

The search engine module 80 may be programmed to perform some or all of the functions of the search engine server 14 including generating and storing search data 36 in response to the user's product search request. In addition, the search engine module 80 may also be programmed to generate a relevance score associated with each of the product records 38 included in the search data 36.

The sorting module 76 may be programmed to perform some or all of the functions of the sorting server 16 including selecting a first sorting value and generating a first sorted group of product records as a function of the first sorting value, and selecting a second sorting value and generating a second sorted group as a function of the product records included in the first sorted group and the second sorting value. In addition, the sorting module 76 may also be programmed to generate a product list as a function of the second sorted group and display the product list on a website in response to the product search request.

Figure 3:
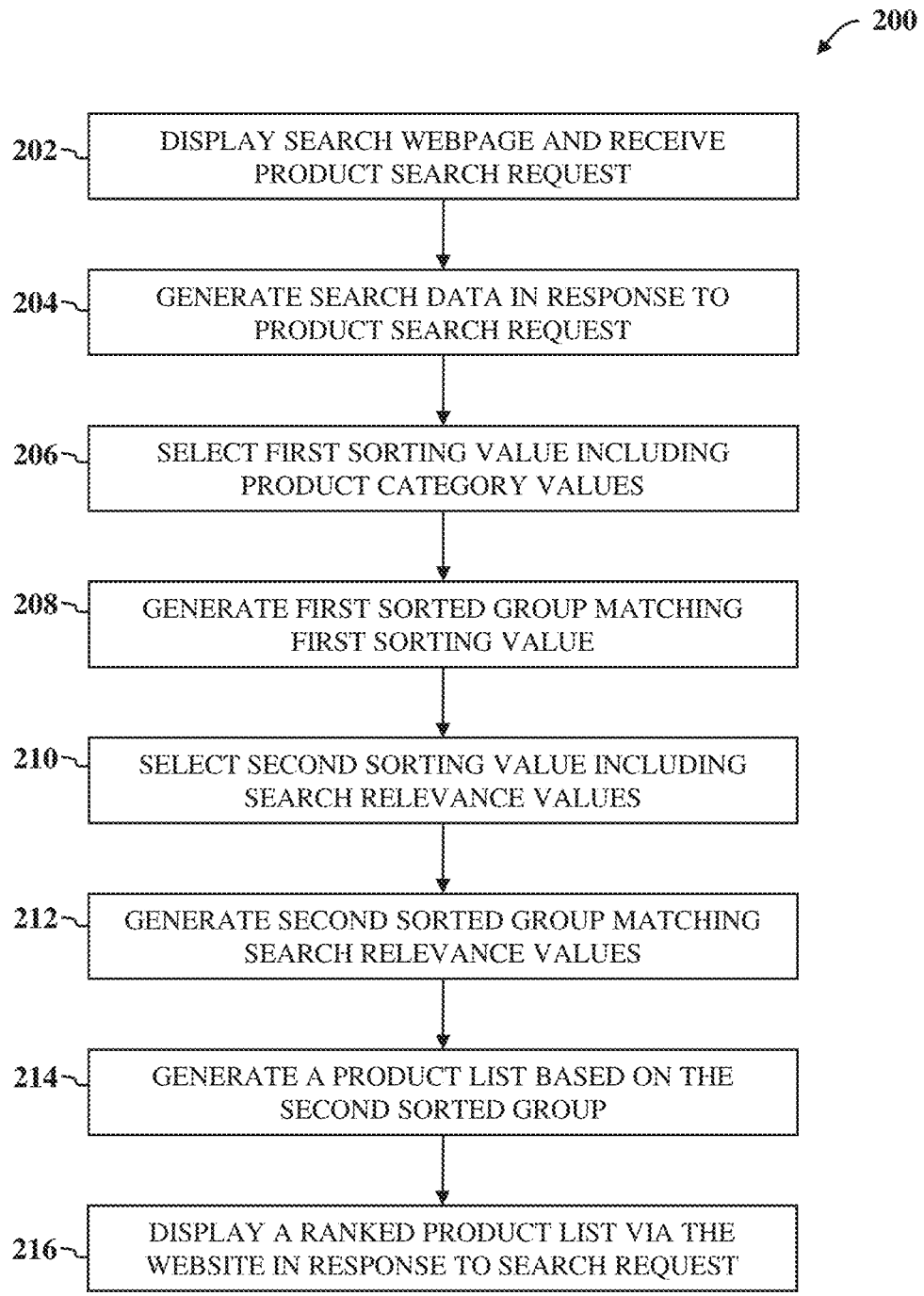
FIG. 3 is a flowchart of a method that may be used with the system shown in FIG. 1, according to an embodiment of the present invention.

FIG. 3 is a flowchart of method 200 that may be used with the system 10 for displaying product information on a website. The method includes a plurality of steps. Each method step may be performed independently of, or in combination with, other method steps. Portions of the method may be performed by any one of, or any combination of, the components of the system 10. FIGS. 4-9 are exemplary graphical displays that may be displayed by the system 10.

In the illustrated embodiment, in method step 202, the website hosting server 12 receives a request from one or more user computing devices 22 to display one or more web pages 28 associated with a website hosted by the system 10, and retrieves and displays the requested web pages 28 on a corresponding user computing device 22. In one embodiment, the website may include an e-commerce website that enables a consumer to view and purchase and/or order various goods and services from one or more merchants via the website. In other embodiments, the website may be a search engine website, an informational website, a blog, a company website, a forum website, a file-sharing website, a social-networking website, and/or any suitable type of website that may be accessed by a user.

In the illustrated embodiment, the website hosting server 12 displays a search webpage 30 that allows users to enter search criteria associated with products that are available for purchase via the website 26. The website hosting server 12 generates a product search request as a function of the search criteria and transmits the search request to the search engine server 14 for use in generating search data in response to the user's search request.

In method step 204, the search engine server 14 generates search data 36 including a plurality of product records 38 as a function of the search terms included in the received product search request. The search engine server 14 generates the search data 36 including product records 38 matching the search criteria, and generates a relevance score 40 associated with each product record 38 included in the search data set 36. The search engine server 14 may also generate the search data 36 including a plurality product records 38 having a plurality of data categories 42 including, but are not limited to, a product description 44, a product category 46, a price data category 48, and/or a relevance score category 50. The search engine server 14 also transmits the search data 36 to the sorting server 16 for use in generating sorted record groups.

In method step 206, the sorting server 16 analyses the search data 36 and selects a first sorting value based on the search data 36. For example, the sorting server 16 may analyze the search data 36 to determine a frequency at which each product category value 54 appears in the search data 36 and select the first sorting value including one or more product category values 54 having high frequency rates.

In method step 208, the sorting server 16 generates a first sorted group 58 including product records 38 having corresponding category values 52 matching the first sorting value. For example, the sorting server 16 may select a first sorting value indicative of the product category value 54 having the highest appearance frequency, and generate the first sorted group 58 including product records 38 having corresponding product category values 54 matching the product category value 54 having the highest appearance frequency.

In method step 210, the sorting server 16 selects a second sorting value indicative of a second data category 42. For example, the sorting server 16 may select the second sorting value including one or more search relevance score values 40 associated with the relevance score data category 50.

In method step 212, the sorting server 16 generates a second sorted group 64 as a function of the first sorted group and the second sorting value. For example, the sorting server 16 may generate the second sorted group 64 including product records 38 included in the first sorted group 58 and having relevance score values 40 that match the selected relevance score values 40.

In method step 214, the sorting server 16 generates a product list 32 based on the second sorted group 64 including product records 38 included in the second sorted group 64 for use in displaying product information to the user in response to the user search request. For example, the sorting server 16 may select a predefined number of product records 38 from the second sorted group 64 to be included in the product list 32.

In method step 216, the sorting server 16 generates a ranked product list 70 based on the corresponding price values 56 associated with each product record 38 included in the product list 32. The sorting server 16 also transmits the ranked product list 70 to the website hosting server 12 to display the ranked product list 70 including product information associated with each product record included in the ranked product list 70 to the user in response to the user's search request.

In general, the system 10 is configured to display a product list to a consumer via a website that is generated as a function of a plurality of sorted groups based on the search criteria received from the consumer. The system 10 generates the sorted groups based on sorting values selected from the product record categories. For example, the system may generate a first sorted group including product records having associated product categories that appear most frequently in the search data, and generate a second sorted group including product records included in the first sorted group and having a search relevance score that matches a selected relevance score. In addition, the system generates and displays the product list including a ranking of product records included in the second sorting group as a function of the corresponding price values.

By generating the first and second sorting groups from search data generated as a function of a user's search criteria, and generating a ranked product list as a function of the sorted groups, the system 10 transforms the search data into relevant product information that is more easily readable by the consumer and more relevant to the needs of the consumer over known search engines. Thus increasing the likelihood of the consumer purchasing a product displayed in the list and increasing the overall revenue being generated by the website. In addition, by generating the sorting groups from the search data and generating the ranked product list based on the sorted data groups, the system 10 improves the speed and functionality of known computer processors by reducing the amount of product records being displayed in response to a user's search request, thus reducing the computing resources necessary to display relevant search results.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A system for displaying product information, comprising:
   a database;
   one or more computer processors; and
   one or more non-transitory memory storage systems storing computing instructions configured to run on the one or more computer processors programmed to:
   receive a product search request;
   determine search data associated with the product search request, the search data comprising a plurality of product records, the plurality of product records including a plurality of data categories comprising corresponding first category values and second category values;
   select a first group of the first category values associated with first data categories of the plurality of data categories, wherein the first group of the first category values are determined by a frequency rate as a function of a number of times at which the first category values appear in the search data, wherein the one or more computer processors are further programmed to:
     determine a first sorting value by the frequency rate of certain ones of the first category values having higher frequencies of appearances in the search data than other ones of the first category values, wherein the certain ones of the first category values are to be listed at a top of a first ranked list of the first data categories in the search data;
     generate the first group of the first category values comprising the certain ones of the first category values that match at least the first sorting value, wherein the plurality of data categories comprise the first ranked list of the first data categories; and
     generate a first sorted group of product records from the top of the first ranked list of the first data categories, the first sorted group of product records comprising product records of the plurality of product records having corresponding ones of the first category values matching the first group of the first category values, wherein the first sorted group of product records comprise a first subset of the plurality of product records of the search data;
   select a second group of the second category values associated with second data categories of the plurality of data categories, wherein the second group of the second category values are based on relevance scores of the plurality of product records in the search data as a function of a number of terms in the product search request matching product descriptions of the plurality of product records in the search data, wherein the second data categories of the plurality of data categories having a higher number of matching terms between the product search request and respective product descriptions of the plurality of product records are listed at a top of a second ranked list of the second data categories, wherein the second group of the second category values comprise higher relevance scores than other ones of the second category values, and wherein the plurality of data categories comprise the second ranked list of the second data categories;

generate a second sorted group of product records from the top of the second ranked list of the second data categories, the second sorted group of product records comprising product records of the plurality of product records having corresponding ones of the second category values matching the second group of the second category values, wherein the second sorted group of product records comprise a second subset of the plurality of product records of the search data;

generate a final product list from an intersection of product records of the plurality of product records between the first sorted group and the second sorted group, the final product list comprising a pre-defined number of product records of the plurality of product records to be displayed; and display the final product list in response to the product search request.

2. The system in accordance with claim 1, wherein the first data categories of the plurality of data categories comprises a plurality of the first category values, the one or more computer processors programmed to select at least one of the first category values indicative of at least one product record of the plurality of product records.

3. The system in accordance with claim 2, wherein the first group of the first category values further comprise a predefined number of the first category values.

4. The system in accordance with claim 2, wherein the second data categories of the plurality of data categories further comprise a plurality of the second category values, the plurality of the second category values comprise search relevance values, the one or more computer processors programmed to select at least one of the second category values indicative of at least one of the search relevance values.

5. The system in accordance with claim 4, wherein the generate the second sorted group further comprises generate the second sorted group of product records including the second subset of the plurality of product records having relevance values of the search relevance values equal to or greater than a predefined value.

6. The system in accordance with claim 5, wherein the select the second group of the second category values further comprises select the second group of the second category values indicative of a range of the search relevance values; and wherein the generate the second sorted group of product records comprises generate the second sorted group including product records of the plurality of product records having the relevance values within the range of the search relevance values.

7. The system in accordance with claim 1, wherein each product record of the plurality of product records includes a price data category including corresponding price values, the one or more computer processors programmed to:
   generate a ranked product list as a function of the corresponding price values and the final product list; and
   display the ranked product list via a website.

8. The system in accordance with claim 1, wherein the one or more computer processors are further programmed to select a number of product records of the plurality of product records to be included in the final product list as a function of a predefined multiple of product records.

9. A method for displaying product information comprising:

receiving, by a computer system using one or more processors, a product search request;

determining, by a search engine server, search data associated with the product search request, the search data comprising a plurality of product records, the plurality of product records including a plurality of data categories comprising corresponding first category values and second category values;

selecting, by a sorting server, a first group of the first category values associated with first data categories of the plurality of data categories, wherein the first group of the first category values are determined by a frequency rate as a function of a number of times at which the first category values appear in the search data, wherein:

determining a first sorting value by the frequency rate of certain ones of the first category values having higher frequencies of appearances in the search data than other ones of the first category values, wherein the certain ones of the first category values are to be listed at a top of a first ranked list of the first data categories in the search data;

generate the first group of the first category values comprising the certain ones of the first category values that match at least the first sorting value, wherein the plurality of data categories comprise the first ranked list of the first data categories; and generating, by the sorting server, a first sorted group of product records from the top of the first ranked list of the first data categories, the first sorted group of product records comprising product records of the plurality of product records having corresponding ones of the first category values matching the first group of the first category values, wherein the first sorted group of product records comprise a first subset of the plurality of product records of the search data;

selecting, by the sorting server, a second group of the second category values associated with second data categories of the plurality of data categories, wherein the second group of the second category values are based on relevance scores of the plurality of product records in the search data as a function of a number of terms in the product search request matching product descriptions of the plurality of product records in the search data, wherein the second data categories of the plurality of data categories having a higher number of matching terms between the product search request and respective product descriptions of the plurality of product records are listed at a top of a second ranked list of the second data categories, wherein the second group of the second category values comprise higher relevance scores than other ones of the second category values, and wherein the plurality of data categories comprise the second ranked list of the second data categories;

generating, by the sorting server, a second sorted group of product records from the top of the second ranked list of the second data categories, the second sorted group of product records comprising product records of the plurality of product records having corresponding ones of the second category values matching the second group of the second category values, wherein the second sorted group of product records comprise a second subset of the plurality of product records of the search data;

generating, by the sorting server, a final product list from an intersection of product records of the plurality of product records between the first sorted group and the second sorted group, the final product list comprising a pre-defined number of product records of the plurality of product records to be displayed; and displaying, by the computer system, the final product list in response to the product search request.

10. The method in accordance with claim 9, wherein the first data categories of the plurality of data categories comprises a plurality of the first category values, selecting at least one of the first category values indicative of at least one product record of the plurality of product records.

11. The method in accordance with claim 10, wherein the first group of the first category values further comprise a predefined number of the first category values.

12. The method in accordance with claim 10, wherein the second data categories of the plurality of data categories further comprises a plurality of the second category values, the plurality of the second category values comprise search relevance values, selecting at least one of the second category values indicative of at least one of the search relevance values.

13. The method in accordance with claim 12, wherein the generating the second sorted group further comprises generating the second sorted group of product records including the second subset of the plurality of product records having relevance values of the search relevance values equal to or greater than a predefined value.

14. The method in accordance with claim 12:
wherein selecting the second group of the second category values further comprises selecting the second group of the second category values indicative of a range of the search relevance values; and,
wherein the generating the second sorted group of product records further comprises generating the second sorted group of product records including product records of the plurality of product records having the relevance values within the range of the search relevance values.

15. The method in accordance with claim 9, wherein each product record of the plurality of product records includes a price data category including corresponding price values, generating a ranked product list as a function of the corresponding price values and the final product list and displaying the ranked product list via a website.

16. One or more non-transitory computer-readable storage media, having computer-executable instructions embodied thereon, wherein when executed by at least one processor, the computer-executable instructions cause the at least one processor to:
receive a product search request;
determine search data associated with the product search request, the search data comprising a plurality of product records, the plurality of product records including a plurality of data categories comprising corresponding first category values and second category values;
select a first group of the first category values associated with first data categories of the plurality of data categories, wherein the first group of the first category values are determined by a frequency rate as a function of a number of times at which the first category values appear in the search data, wherein the computer-executable instructions further cause the at least one processor to:
  determine a first sorting value by the frequency rate of certain ones of the first category values having higher frequencies of appearances in the search data than other ones of the first category values, wherein the certain ones of the first category values are to be listed at a top of a first ranked list of the first data categories in the search data;
  generate the first group of the first category values comprising the certain ones of the first category values that match at least the first sorting value, wherein the plurality of data categories comprise the first ranked list of the first data categories; and
  generate a first sorted group of product records from the top of the first ranked list of the first data categories, the first sorted group of product records comprising product records of the plurality of product records having corresponding ones of the first category values matching the first group of the first category values, wherein the first sorted group of product records comprise a first subset of the plurality of product records of the search data;
select a second group of the second category values associated with second data categories of the plurality of data categories, wherein the second group of the second category values are based on relevance scores of the plurality of product records in the search data as a function of a number of terms in the product search request matching product descriptions of the plurality of product records in the search data, wherein the second data categories of the plurality of data categories having a higher number of matching terms between the product search request and respective product descriptions of the plurality of product records are listed at a top of a second ranked list of the second data categories, wherein the second group of the second category values comprise higher relevance scores than other ones of the second category values, and wherein the plurality of data categories comprise the second ranked list of the second data categories;
generate a second sorted group of product records from the top of the second ranked list of the second data categories the second sorted group of product records comprising product records of the plurality of product records having corresponding one of the second category values matching the second group of the second category values, wherein the second sorted group of product records comprise a second subset of the plurality of product records of the search data;
generate a final product list from an intersection of product records of the plurality of product records between the first sorted group and the second sorted group, the final product list comprising a pre-defined number of product records of the plurality of product records to be displayed; and
display the final product list in response to the product search request.

17. The one or more non-transitory computer-readable storage media of claim 16, wherein the second data categories of the plurality of data categories further comprises a plurality of the second category values, the plurality of the second category values comprise search relevance values, selecting at least one of the second category values indicative of at least one of the search relevance values.

18. The one or more non-transitory computer-readable storage media of claim 16, wherein the generating the second sorted group further comprises generating the second sorted group of product records including the second subset of the plurality of product records having relevance values of the search relevance values equal to or greater than a predefined value.

19. The one or more non-transitory computer-readable storage media of claim 17:
   wherein selecting the second group of the second category values further comprises selecting the second group of the second category values indicative of a range of the search relevance values; and,
   wherein the generating the second sorted group of product records further comprises generating the second sorted group of product records including the second subset of the plurality of product records having the relevance values within the range of the search relevance values.

20. The one or more non-transitory computer-readable storage media of claim 16, wherein each product record of the plurality of product records includes a price data category including corresponding price values, generating a ranked product list as a function of the corresponding price values and the final product list and displaying the ranked product list via a web site.

* * * * *